(12) United States Patent
Niwa

(10) Patent No.: US 8,616,771 B2
(45) Date of Patent: Dec. 31, 2013

(54) FLUID DYNAMIC BEARING DEVICE

(75) Inventor: Hiroshi Niwa, Kuwana (JP)

(73) Assignee: NTN Corporation, Osaka (JP)

( * ) Notice: Subject to any disclaimer, the term of this patent is extended or adjusted under 35 U.S.C. 154(b) by 192 days.

(21) Appl. No.: 13/257,796

(22) PCT Filed: Mar. 29, 2010

(86) PCT No.: PCT/JP2010/055501
§ 371 (c)(1),
(2), (4) Date: Sep. 20, 2011

(87) PCT Pub. No.: WO2010/125884
PCT Pub. Date: Nov. 4, 2010

(65) Prior Publication Data
US 2012/0008888 A1    Jan. 12, 2012

(30) Foreign Application Priority Data

Apr. 27, 2009   (JP) .................................. 2009-107954

(51) Int. Cl.
*F16C 32/06*   (2006.01)
(52) U.S. Cl.
USPC .......................................... 384/100; 384/107
(58) Field of Classification Search
USPC .................... 384/100, 10, 114, 107, 121
See application file for complete search history.

(56) References Cited

U.S. PATENT DOCUMENTS

| 2007/0274617 A1 | 11/2007 | Shibahara et al. |
| 2009/0297076 A1 | 12/2009 | Murakami et al. |
| 2010/0061669 A1 | 3/2010 | Murakami et al. |

FOREIGN PATENT DOCUMENTS

| CN | 1957184 A | 5/2007 |
| CN | 101163897 A | 4/2008 |
| JP | 2005-282779 A | 10/2005 |
| JP | 2005-315408 A | 11/2005 |
| JP | 2006-329273 A | 12/2006 |
| JP | 2007-085448 A | 4/2007 |
| WO | WO 2006126336 A1 * | 11/2006 |

OTHER PUBLICATIONS

International Search Report of PCT/JP2010/055501, mailing date Jun. 15, 2010.
Notification of Transmittal of Translation of the International Preliminary Report on Patentability (Form PCT/IB/338) of International Application No. PCT/JP2010/055501 mailed Dec. 1, 2011 with Forms PCT/IB/373 and PCT/ISA/237.
Chinese Office Action issued Apr. 3, 2013 in corresponding Chinese Patent Application No. 201080018206.7; with partial English translation (9 pages).

* cited by examiner

*Primary Examiner* — Thomas R Hannon
(74) *Attorney, Agent, or Firm* — Westerman, Hattori, Daniels & Adrian, LLP

(57) ABSTRACT

A flatness of a part of a component formed of a resin material that faces a thrust bearing gap is easily increased. A housing (7) is injection-molded using a resin material and has a bottomed-cylindrical shape integrally including a cylindrical side portion (7a) and a flat bottom portion (7b). The resin material to be used for the injection molding of the housing (7) contains, as filler, a reinforcing fiber having a fiber diameter of 6 to 8 μm and an aspect ratio of 10 to 40.

5 Claims, 7 Drawing Sheets

Fig. 10

|  | Example | | | Comparative example | | | |
| --- | --- | --- | --- | --- | --- | --- | --- |
|  | 1 | 2 | 3 | 1 | 2 | 3 | 4 |
| fiber diameter[$\mu$m] | 6.8 | 7.4 | 7 | 6 | 9 | 9 | 6 |
| aspect ratio | 40 | 10 | 20 | 50 | 4 | 4 | 50.3 |
| average of fiber length[$\mu$m] | 272 | 74 | 140 | 300 | 36 | 36 | 302 |
| flatness[$\mu$m] | 3.1~5.1 | 3.1~5.1 | 3~6 | 11~20 | 11~20 | 10~25 | 10~25 |
| resistance value[$\Omega$] | 400 | 250 | 200 | 1300 | 1500 | 1500 | 1300 |
| judgment | ○ | ○ | ○ | × | × | × | × |

FLUID DYNAMIC BEARING DEVICE

TECHNICAL FIELD

The present invention relates to a fluid dynamic bearing device.

BACKGROUND ART

A fluid dynamic bearing device is a bearing device including a stator and a rotor, which holds the stator and the rotor in a non-contact manner through a pressure generated by a dynamic pressure action, which is generated in a fluid (for example, lubricating oil) filled into a bearing gap between the stator and the rotor. The fluid dynamic bearing device has features such as high-speed rotation, high rotational accuracy, and quietness. In recent years, by taking advantage of those features, the fluid dynamic bearing device has been suitably used as a bearing device for a motor to be mounted to various electrical apparatuses such as information apparatuses. Specifically, the fluid dynamic bearing device has been suitably used as a bearing device to be incorporated into, for example, a spindle motor to be mounted to a disk drive such as an HDD, a polygon scanner motor to be mounted to a laser beam printer, and a fan motor to be mounted to a PC.

Of the above-mentioned motors, for example, in the spindle motor for a disk drive, the fluid dynamic bearing device incorporated thereto includes a radial bearing portion for supporting the rotor in a radial direction, and a thrust bearing portion for supporting the rotor in a thrust direction. In recent years, both the radial bearing portion and the thrust bearing portion have been constructed of fluid dynamic bearings in many cases, which are provided with dynamic pressure generating portions, such as dynamic pressure generating grooves, each arranged in any one of the two surfaces opposing through a radial bearing gap and a thrust bearing gap.

Nowadays, the price of the information apparatuses has been rapidly dropped and the use of mobile information apparatuses has been rapidly spread, which severely raises a demand for reduction in cost and weight of the fluid dynamic bearing device. In order to meet the demand, there have been various proposals to partially or entirely form the stator and the rotor of a resin, and as an example thereof, there is a fluid dynamic bearing device disclosed in JP 2005-282779A (Patent Document 1). In the fluid dynamic bearing device disclosed in Patent Document 1, the housing serving as the stator is injection-molded into a bottomed-cylindrical shape using a resin material, and the thrust bearing portion constructed of the fluid dynamic bearing is formed between the housing and the shaft member serving as the rotor, which is arranged on the inner periphery of the housing. In the fluid dynamic bearing device, at the time of activation, stop, or the like, sliding contact occurs between the end surface (inner bottom surface) of the housing and the opposing end surface of the shaft member. In order to prevent the end surface of the housing from being worn out by the sliding contact, the resin material that forms the housing is generally formulated with a predetermined amount of reinforcing fiber.

However, depending on the fiber diameter or the like of the reinforcing fiber to be formulated into the resin material, the counterpart member may be damaged and worn out. Therefore, there is a proposal in which the fiber diameter or the like of the reinforcing fiber to be formulated is specified (see, for example, Patent Document 2). In the fluid dynamic bearing device disclosed in Patent Document 2, the fiber diameter of the reinforcing fiber to be formulated is limited to 1 to 12 μm, to thereby prevent the above-mentioned trouble.

CITATION LIST

Patent Document

Patent Document 1: JP 2005-282779 A
Patent Document 2: JP 2005-315408 A

SUMMARY OF INVENTION

Technical Problem

By the way, the gap width of the thrust bearing gap directly influences the bearing performance of the thrust bearing portion. Therefore, in the above-mentioned fluid dynamic bearing device, the end surface of the housing serving as one surface that forms the thrust bearing gap needs to be finished to a flatness in the order of microns (see JIS B 0621). However, according to the verification conducted by the inventor of the present invention, the following has been found as a result. That is, when the housing is injection-molded using the resin material formulated with the reinforcing fiber having the above-mentioned fiber diameter, the above-mentioned flatness is not satisfied in some cases no matter how the molding condition such as an injection rate is set. Needless to say, there may be a case where the above-mentioned flatness is satisfied, but it is necessary to take measures to control the injection rate with high accuracy so as to fall within a narrow range, and particularly devise the shape of the die. Thus, the manufacturing cost is inevitably increased.

It is an object of the present invention to easily increase a flatness of apart of a component formed of a resin material that faces a thrust bearing gap, thereby providing a fluid dynamic bearing device having a high rotational accuracy at low cost.

Solution to Problem

In order to achieve the above-mentioned object, the present invention provides a fluid dynamic bearing device, including: a stator; a rotor; a radial bearing portion for holding the stator and the rotor in a radial direction in a non-contact manner by a dynamic pressure action of a fluid that is generated in a radial bearing gap between the stator and the rotor; and a thrust bearing portion for holding the stator and the rotor in a thrust direction in a non-contact manner by a dynamic pressure action of the fluid that is generated in a thrust bearing gap between the stator and the rotor, a part of at least one of the stator and the rotor that faces the thrust bearing gap being formed of a resin material, in which the resin material contains, as filler, a reinforcing fiber having a fiber diameter of 6 to 8 μm and an aspect ratio of 10 to 40. Note that, the "aspect ratio" herein represents a ratio (L/D) of a fiber diameter (D) with respect to a fiber length (L).

The inventor of the present invention has made efforts to study and as a result, found that the above-mentioned trouble occurs due to a great unevenness in size of the reinforcing fiber to be formulated into the resin material. In view of this, the inventor of the present invention has made further efforts to study and as a result, found that, by using the resin material formulated with the reinforcing fiber having the fiber diameter of 6 to 8 μm and the aspect ratio of 10 to 40 as described above (limiting the available reinforcing fiber), the required flatness can be ensured while easing the molding condition.

Calculating from the above-specified fiber diameter (D) and aspect ratio (L/D), the fiber length (L) of the available reinforcing fiber ranges from 60 to 320 μm, but it is desired that the reinforcing fiber to be used have a mean fiber length of 100 to 200 μm. This is because the required flatness can be ensured as appropriate for the part facing the thrust bearing gap while effectively obtaining a reinforcing effect owing to the formulation of the reinforcing fiber.

In the case where the above-mentioned reinforcing fiber is used, it is desired that a formulation amount of the reinforcing fiber in the resin material range from 5 to 40 mass %. The specified formulation amount falls within such a range for the following reasons. That is, when the formulation amount exceeds 40 mass %, the counterpart member may be damaged and worn out due to an increase in frequency of contact between the reinforcing fiber and (the sliding surface of) the counterpart member. Further, when the formulation amount falls below 5 mass %, it is impossible to obtain a sufficient reinforcing effect owing to the formulation of the reinforcing fiber, which may result in shortage of the required wear resistance of the resin part.

It is desired that a total amount of the filler in the resin material (in a case where filler other than the reinforcing fiber is formulated, the total amount of filler including the filler) be set to 45 mass % or less. The reason therefor is as follows. That is, when the total amount of filler exceeds 45 mass %, the flowability of the resin material is lowered remarkably, and as a result, it may be difficult to ensure a predetermined accuracy for the resin part.

As the reinforcing fiber, a carbon fiber, a glass fiber, and an epoxy-based, polyamide-based, or phenol-based organic fiber may be used. Among others, the carbon fiber capable of imparting a high dimensional stability to the resin material (molded article) is suitable, and further, of the carbon fiber, a polyacrylonitrile-based (PAN-based) carbon fiber that exhibits excellent properties for strength and a modulus of elasticity is particularly suitable. Further, by using the carbon fiber as the reinforcing fiber, it is possible to impart a high electrical conductivity to the resin material (molded article). Thus, it is possible to efficiently dissipate static electricity resulting from charging of the rotor to a ground side.

When parts of the stator and the rotor that face the thrust bearing gap are both formed of a resin material, linear expansion coefficients of the stator and the rotor in the axial direction become substantially equal to each other. Therefore, as compared to a case where one of the two is formed of a resin material and the other is formed of a metal material, it is possible to reduce the amount of fluctuation in gap width of the thrust bearing gap that is caused along with a change in temperature, and to prevent the decrease in supportability in the thrust bearing portion to the extent possible. At this time, when the parts of the stator and the rotor that face the thrust bearing gap are formed of resin materials containing different base resins, respectively, it is possible to prevent adhesion due to the sliding contact between the stator and the rotor, which is desirable.

As a specific example of the stator having the part facing the thrust bearing gap, there is a housing fixed to a motor bracket or a thrust member (thrust bush) fixed to the housing. Further, as a specific example of the rotor having the part facing the thrust bearing gap, there is a flange portion provided to the shaft member or a rotational member having a mounting portion for a rotor magnet. Note that, as an example corresponding to the rotational member to be used herein, there is a disk hub having a disk mounting surface.

Advantageous Effects of the invention

As described above, according to the present invention, it is possible to easily increase the flatness of the part of the component formed of the resin material that faces the thrust bearing gap, thereby providing the fluid dynamic bearing device having a high rotational accuracy at low cost.

BRIEF DESCRIPTION OF DRAWINGS

[FIG. 10] A table showing results of verification for demonstrating usefulness of the present invention.

DESCRIPTION OF EMBODIMENTS

Hereinbelow, embodiments of the present invention are described with reference to the drawings.

Figure 1:
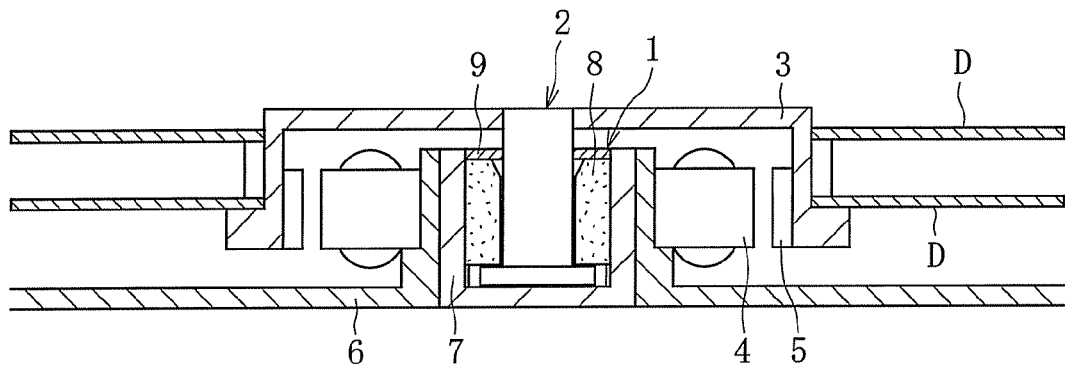
[FIG. 1] A sectional view conceptually illustrating an example of a spindle motor for information apparatuses.

FIG. 1 conceptually illustrates an example of a structure of a spindle motor for information apparatuses that incorporates a fluid dynamic bearing device. The spindle motor is used for a disk drive such as an HDD, and includes a fluid dynamic bearing device 1 for rotatably supporting a shaft member 2 in a non-contact manner, a disk hub 3 provided at one end of the shaft member 2, a stator coil 4 and a rotor magnet 5 opposed to each other through the intermediation of, for example, a radial gap, and a bracket 6 having a housing 7 of the fluid dynamic bearing device 1 fixed to an inner periphery thereof. The stator coil 4 is mounted along an outer periphery of the bracket 6, and the rotor magnet 5 is mounted along an inner periphery of the disk hub 3. On the disk hub 3, one or a plurality of disks D (in the example of FIG. 1, two), such as magnetic disks, are held. In the above-mentioned structure, when the stator coil 4 is energized, the rotor magnet 5 is rotated with an electromagnetic force between the stator coil 4 and the rotor magnet 5, and accordingly the disk hub 3 and the disks D held thereon are integrally rotated with the shaft member 2.

Figure 2:
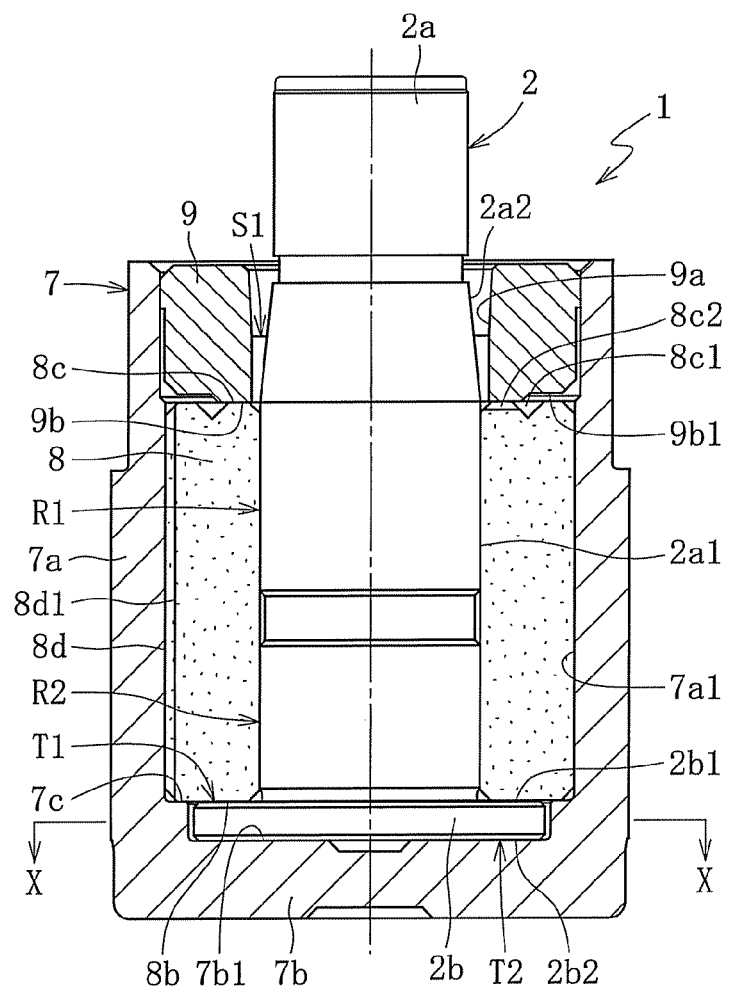
[FIG. 2] A sectional view illustrating a fluid dynamic bearing device according to a first embodiment of the present invention.

FIG. 2 illustrates the fluid dynamic bearing device 1 according to a first embodiment of the present invention. The fluid dynamic bearing device 1 illustrated in FIG. 2 includes, as main components thereof, the shaft member 2, a bearing sleeve 8 having the shaft member 2 inserted into an inner periphery thereof, the housing 7 having the bearing sleeve 8 fixed to an inner periphery thereof, and a sealing member 9 for sealing an opening at one end of the housing 7. In this embodiment, the shaft member 2 constitutes a rotor, and the members other than the shaft member 2 (housing 7 etc.) constitute a stator. Note that, for the sake of convenience in the description, the sealing member 9 side is referred to as upper side, and the axially opposite side thereto is referred to as lower side.

The shaft member 2 is made of, for example, a stainless steel, and integrally or separately includes a shaft portion 2a and a flange portion 2b projecting radially outward from a lower end of the shaft portion 2a so that the shaft member 2 is formed into an inverse T-shape in cross section. An outer peripheral surface 2a1 of the shaft portion 2a is a smooth cylindrical surface having no projection and recess except that annular recessed portions are provided in the vicinity of an upper end portion thereof and in a substantially center portion thereof. Further, both end surfaces 2b1 and 2b2 of the flange portion 2b are smooth flat surfaces having no projection and recess, respectively.

The bearing sleeve 8 is made of a porous body of a sintered metal mainly containing, for example, copper, and is formed into a cylindrical shape. The bearing sleeve 8 is fixed to an inner peripheral surface 7a1 of the housing 7 by means of press fitting, bonding, or the like as appropriate. The bearing sleeve 8 may be made of other materials than the sintered metal, for example, a soft metal material such as brass or a porous body other than that of the sintered metal, such as a porous resin.

Figure 3A:
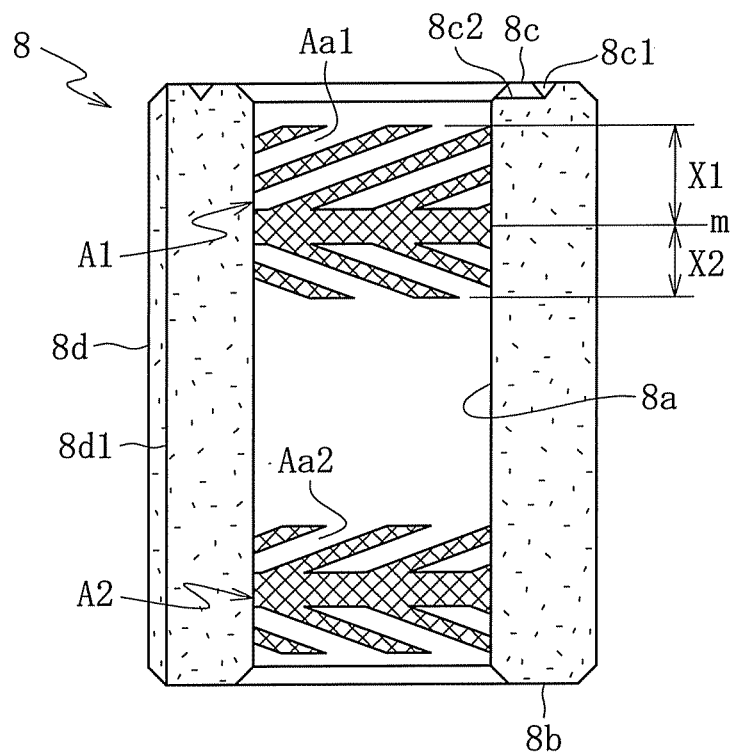
[FIG. 3A] A sectional view of a bearing sleeve.

In an inner peripheral surface 8a of the bearing sleeve 8, cylindrical regions serving as radial bearing surfaces of first and second radial bearing portions R1 and R2 are provided at two upper and lower positions of the inner peripheral surface 8a while being spaced apart from each other. As illustrated in FIG. 3A, in the two regions, respectively, there are provided radial dynamic pressure generating portions A1 and A2 having a plurality of dynamic pressure generating grooves Aa1 and Aa2 arranged in a herringbone pattern. In this embodiment, the upper dynamic pressure generating grooves Aa1 are formed asymmetrically in an axial direction across an axial center m, and an axial dimension X1 in an upper region with respect to the axial center m is larger than an axial dimension X2 in a lower region with respect to the axial center m. On the other hand, the lower dynamic pressure generating grooves Aa2 are formed symmetrically in the axial direction, and axial dimensions in upper and lower regions thereof are each equal to the above-mentioned axial dimension X2. Note that, one or both of the two radial dynamic pressure generating portions A1 and A2 may be formed in the outer peripheral surface 2a1 of the shaft portion 2a, and a plurality of dynamic pressure generating grooves may be arranged in a spiral pattern or other such known pattern.

Figure 3B:
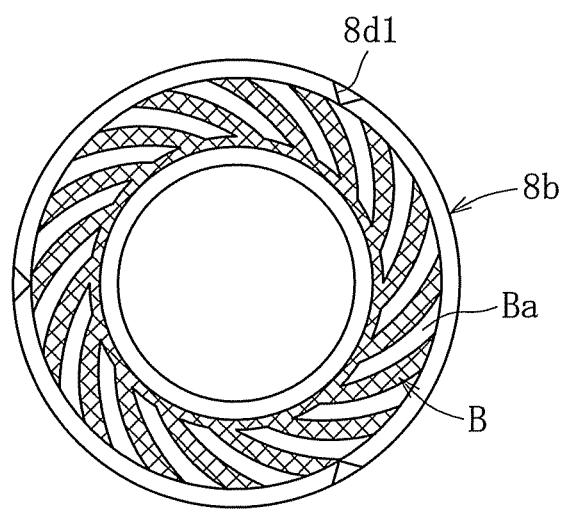
[FIG. 3B] A view illustrating a lower end surface of the bearing sleeve.

In a lower end surface 8b of the bearing sleeve 8, an annular region serving as a thrust bearing surface of a first thrust bearing portion T1 is provided, and as illustrated in FIG. 3B, in the annular region, there is provided a thrust dynamic pressure generating portion B having a plurality of dynamic pressure generating grooves Ba arranged in a spiral pattern. Note that, the thrust dynamic pressure generating portion B may be formed in the upper end surface 2b1 of the flange portion 2b, and a plurality of dynamic pressure generating grooves may be arranged in a herringbone pattern or other such known pattern.

In an outer peripheral surface 8d of the bearing sleeve 8, there are formed one or a plurality of axial grooves 8d1 (in this embodiment, three; see FIG. 3B) opened in both end surfaces 8b and 8c. Further, in the upper end surface 8c of the bearing sleeve 8, there are formed a circular groove 8c1 and one or a plurality of radial grooves 8c2 connected to a radially inner side of the circular groove 8c1.

The sealing member 9 is made of, for example, a soft metal material such as brass or other such metal material, or a resin material, and is formed into a ring shape. The sealing member 9 is fixed to the inner peripheral surface 7a1 of the housing 7 by means of press fitting, bonding, or the like as appropriate. Between an inner peripheral surface 9a of the sealing member 9 and a tapered surface 2a2 of the shaft portion 2a, there is formed a seal space S having a tapered shape in cross section, in which its diameter is decreased downward. Of a lower end surface 9b of the sealing member 9, in a radially outer region with respect to a substantially radially center portion, there is formed a stepped surface 9b1 retracted upward relative to a radially inner region.

Figure 4:
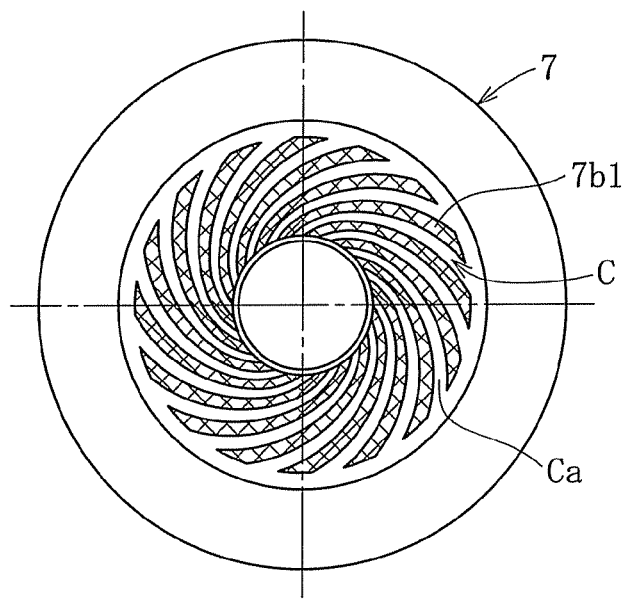
[FIG. 4] A sectional view taken along the arrow X-X of FIG. 2, illustrating an upper end surface of a housing bottom portion.

The housing 7 integrally includes a cylindrical side portion 7a and a disk-like bottom portion 7b that closes a lower end opening of the side portion 7a so that the housing 7 is formed into a bottomed-cylindrical shape (cup shape). Further, the housing 7 of this embodiment integrally includes a stepped portion 7c arranged in an inner periphery of a boundary between the side portion 7a and the bottom portion 7b. When assembling the fluid dynamic bearing device 1, the bearing sleeve 8 is inserted into the inner periphery of the housing 7 up to the point at which the lower end surface 8b abuts against the stepped portion 7c, and thus thrust bearing gaps of first and second thrust bearing portions T1 and T2 are each set to a specified gap width. In an upper end surface 7b1 of the bottom portion 7b, an annular region serving as a thrust bearing surface of the second thrust bearing portion T2 is provided, and as illustrated in FIG. 4, in the annular region, there is provided a thrust dynamic pressure generating portion C having a plurality of dynamic pressure generating grooves Ca arranged in a spiral pattern.

Figure 5:
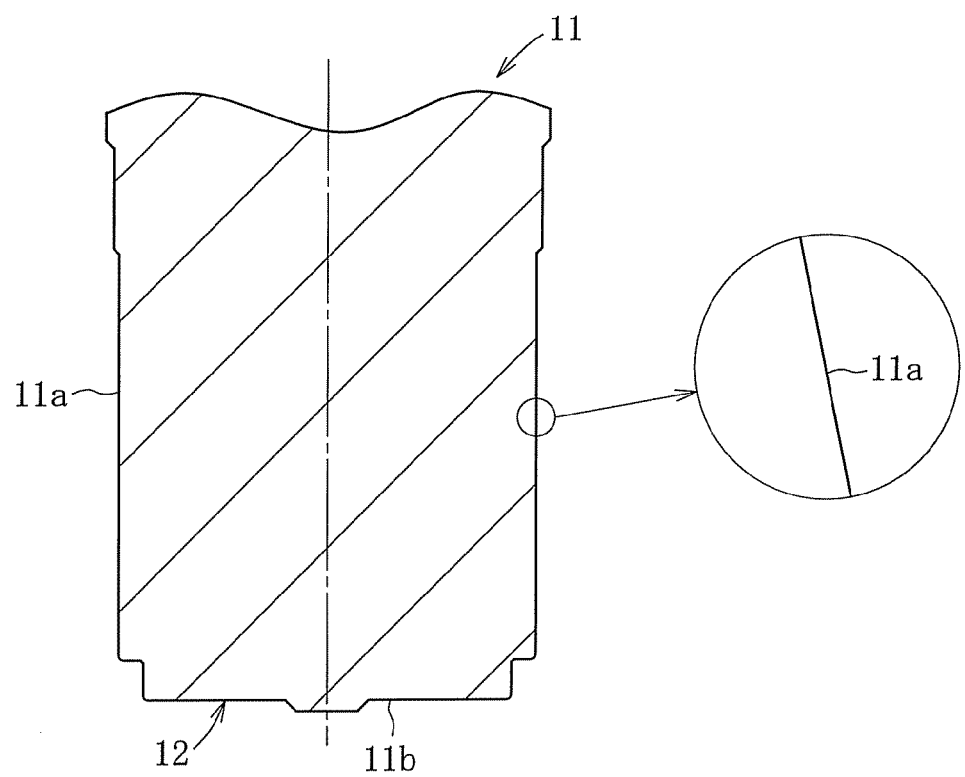
[FIG. 5] An enlarged sectional view of a main part of a die to be used for injection molding of the housing.

The above-mentioned housing 7 is made of a resin, and is injection-molded by injecting and filling the resin material into a cavity formed between a male die 11 as illustrated in, for example, FIG. 5 and a female die (not shown). By the way, in a case where the housing 7 having the bottomed-cylindrical shape as described in this embodiment is injection-molded by using a die shaped in conformity to the inner surface of the housing 7, due to an influence of, for example, a warp that is caused along with molding shrinkage, the upper end surface 7b1 of the bottom portion 7b cannot be finished to a predetermined flatness (for example, 7 μm or less) in some cases. Specifically, the side portion 7a of the housing 7 is formed into a substantially V-shape, in which the side portion 7a is enlarged toward the upper side thereof, and accordingly the bottom portion 7b is formed into an arc shape, in which the bottom portion 7b projects upward toward a radially center portion thereof. In order to prevent such a phenomenon to the extent possible, as illustrated in the enlarged view of FIG. 5, an outer peripheral surface 11a of the male die 11 serving as a surface for molding the inner peripheral surface 7a1 of the housing 7 (side portion 7a) is set as a tapered surface so that a radially outer dimension thereof is gradually decreased upward. Further, in a lower end surface 11b of the male die 11, there is provided a groove die 12 conforming to the shape of the thrust dynamic pressure generating portion C. Thus, in this embodiment, the thrust dynamic pressure generating portion C is die-molded at the same time as when the housing 7 is injection-molded.

The resin material (resin composition) to be used for the injection molding of the housing 7 is one using a thermoplastic resin as a base resin. As the base resin, there may be used, for example, a crystalline resin such as a liquid crystal polymer (LCP), polyphenylene sulfide (PPS), or polyether ether ketone (PEEK), or an amorphous resin such as polysulfone (PSU), polyethersulfone (FES), or polyphenylsulfone (PPSU). Among others, the LCP and PPS are particularly suitable because the LCP and PPS exhibit excellent properties for oil resistance, dimensional stability, mechanical strength, and the like. In this embodiment, the housing 7 is injection-molded using a resin material containing the LCP as a base resin.

To the above-mentioned resin material, a predetermined amount of filler for imparting various properties thereto is formulated. As the filler, at least a reinforcing fiber typified by a carbon fiber, a glass fiber, and an epoxy-based, polyamide-based, or phenol-based organic fiber is used. In this embodiment, the carbon fiber capable of imparting a high dimensional stability and serving also as a conductive material is used. Further, of the carbon fiber, a PAN-based carbon fiber that exhibits excellent properties for strength and a modulus of elasticity is used. Note that, in a case where the carbon fiber alone cannot satisfy the required electrical conductivity, a conductive material of other type, typified by whisker filler such as potassium titanate, and a carbon nanomaterial such as a carbon nanotube, may be formulated additionally into the above-mentioned resin material. Further, in a case where mold-releasability after the injection molding is to be improved, a mold releasing material such as fluorine powder may be formulated additionally into the above-mentioned resin material.

The fluid dynamic bearing device 1 is structured as described above, and a lubricating oil as a fluid is filled into an inner space of the housing 7 sealed by the sealing member 9, including inner pores of the bearing sleeve 8.

In the fluid dynamic bearing device 1 structured as described above, when the shaft member 2 serving as the rotor rotates, radial bearing gaps are formed between the outer peripheral surface $2a1$ of the shaft portion $2a$ and the respective radial dynamic pressure generating portions A1 and A2 provided in the axial direction in the inner peripheral surface $8a$ of the bearing sleeve 8 while being spaced apart from each other. Then, along with the rotation of the shaft member 2, rigidities of oil films formed in both the radial bearing gaps are increased by the dynamic pressure action of the dynamic pressure generating grooves Aa1 and Aa2, and with this pressure, the shaft member 2 is rotatably supported in the radial direction in a non-contact manner. In this manner, the first and second radial bearing portions R1 and R2 for rotatably supporting the shaft member 2 in the radial direction in a non-contact manner are formed at two positions in the axial direction while being spaced apart from each other.

At the same time, a thrust bearing gap is formed between the upper end surface $2b1$ of the flange portion $2b$ and the thrust dynamic pressure generating portion B provided in the lower end surface $8b$ of the bearing sleeve 8, and further a thrust bearing gap is formed between the lower end surface $2b2$ of the flange portion $2b$ and the thrust dynamic pressure generating portion C provided in the upper end surface $7b1$ of the bottom portion $7b$ of the housing 7. Then, along with the rotation of the shaft member 2, rigidities of oil films formed in both the thrust bearing gaps are increased by the dynamic pressure action of the dynamic pressure generating grooves Ba and Ca, and with this pressure, the shaft member 2 is rotatably supported in both the thrust directions in a non-contact manner. In this manner, the first thrust bearing portion T1 and the second thrust bearing portion T2 for rotatably supporting the shaft member 2 in both the thrust directions in a non-contact manner are formed.

As described above, the seal space S has the tapered shape, that is, the size of the seal space S is gradually decreased downward, and hence, when the shaft member 2 rotates, the lubricating oil within the seal space S is drawn toward the inner portion of the housing 7, in which the seal space becomes narrower, by the drawing action due to the capillary force. Further, in this embodiment, the radially outer dimension of the tapered surface $2a2$ of the shaft portion $2a$ that forms the seal space S is gradually decreased upward, and hence, when the shaft member 2 rotates, a function as a centrifugal force seal is also added. With those matters as described above, the lubricating oil is effectively prevented from leaking out of the housing 7. Further, the seal space S has a buffer function of absorbing an amount of change in volume that is caused along with a change in temperature of the lubricating oil filled into the inner space of the housing 7, and hence the oil surface of the lubricating oil is constantly located within the seal space S within the range of the conceivable change in temperature.

Further, the upper dynamic pressure generating grooves Aa1 that form the first radial bearing portion R1 are formed asymmetrically in the axial direction across the axial center m, and the axial dimension X1 in the upper region with respect to the axial center m is larger than the axial dimension X2 in the lower region with respect to the axial center m. Therefore, when the shaft member 2 rotates, the drawing force (pumping force) for the lubricating oil by the dynamic pressure generating grooves Aa1 is relatively larger in the upper region than in the lower region. Then, the lubricating oil filled into the gap between the inner peripheral surface $8a$ of the bearing sleeve 8 and the outer peripheral surface $2a1$ of the shaft portion $2a$ flows downward due to the difference in drawing force, and circulates through a path constructed of the following in the following order: the gap between the lower end surface $8b$ of the bearing sleeve 8 and the upper end surface $2b1$ of the flange portion $2b$; the fluid passage formed by the axial grooves $8d1$ of the bearing sleeve 8; the fluid passage formed by the stepped surface $9b1$ of the sealing member 9; and the fluid passage formed by the circular groove $8c1$ and the radial grooves $8c2$ of the bearing sleeve 8. In this manner, the lubricating oil is drawn again into the radial bearing gap of the first radial bearing portion R1.

As described above, by causing the lubricating oil to flow and circulate in the inner space of the housing 7, the balance of the pressure of the lubricating oil is maintained, and at the same time, it is possible to solve the problems such as generation of air bubbles involved in local generation of a negative pressure, leakage of the lubricating oil due to the generation of air bubbles, and occurrence of vibration. A seal space S1 communicates to the above-mentioned circulation path, and hence, even in a case where air bubbles are mixed in the lubricating oil for some reason, the air bubbles are discharged to the outside air from the oil surface (air liquid interface) of the lubricating oil in the seal space S when the air bubbles circulate together with the lubricating oil. Thus, the adverse effect due to the air bubbles is more effectively prevented.

By the way, in the fluid dynamic bearing device 1 of this type, the gap widths of the respective bearing gaps directly influence the bearing performance of the respective bearing portions R1, R2, T1, and T2, and hence the surfaces of the shaft member 2, the bearing sleeve 8, and the housing 7 that form the bearing gaps each need to be finished with high accuracy. In particular, of the above-mentioned respective members, in the housing 7 that is an injection-molded article of a resin, it is important how the upper end surface $7b1$ of the bottom portion $7b$ serving as one surface that forms the thrust bearing gap of the second thrust bearing portion T2 can be finished to a predetermined flatness at low cost.

The inventor of the present invention has made efforts to study and found that, by injection-molding the housing 7 using a resin material formulated with a reinforcing fiber (in this case, PAN-based carbon fiber) having a fiber diameter of 6 to 8 μm and an aspect ratio of 10 to 40, more desirably, a mean fiber length of 100 to 200 μm, it becomes easier to finish the upper end surface 7b1 of the bottom portion 7b to a predetermined value of flatness while satisfying the required strength of the housing 7 Specifically, the inventor of the present invention has found that, even when the limit on the rate of injection of the resin material into the cavity is removed, and even when the shape of the die for molding the upper end surface 7b1 of the bottom portion 7b (thrust dynamic pressure generating portion C) is simplified, the upper end surface 7b1 of the bottom portion 7b can be finished to a predetermined flatness.

More specifically, for example, in a case of injection-molding the housing 7 using a resin material formulated with a carbon fiber having a fiber diameter of 6 to 9 μm and an aspect ratio of 4 to 50 (fiber length of 36 to 300 μm), in order to satisfy the required flatness of the upper end surface 7b1 of the bottom portion 7b, it is necessary to set the injection rate to 150 to 200 mm/s, and set, of the outer peripheral surface 11a of the male die 11, the diameter difference within the region for molding the inner peripheral surface 7a1 of the housing 7, to 40 to 45 μm (set the outer peripheral surface 11a to have a tapered surface in which the lower end portion of the molding region is larger in diameter by 40 to 45 μm than the upper end portion of the molding region). In this respect, as the diameter difference between the upper and lower end portions of the outer peripheral surface 11a of the male die 11 becomes larger, the degree of "forced extraction" at the time of mold releasing becomes higher, and therefore it becomes difficult to perform mold releasing without deforming and damaging the housing 7.

In contrast, when the above-mentioned structure of the present invention is employed, the diameter difference between the upper and lower end portions of the outer peripheral surface 11a of the male die 11 can be set to 30 μm or less, that is, the releasing of the male die 11 can be facilitated. Further, even when the injection rate is set to 100 mm/s or less, or to 200 mm/s or more, the required flatness can be ensured and the condition required at the time of molding the housing 7 is eased.

Further, when the fluid dynamic bearing device 1 operates, the rotor is charged with static electricity due to, for example, friction between the rotor and the air, but when the charging of the rotor is left uncontrolled, a serious trouble (for example, damage to peripheral apparatuses) may occur. Therefore, it is extremely important to impart a predetermined electrical conductivity to the housing 7 for dissipating the static electricity resulting from the charging to the bracket 6 (see FIG. 1) on the ground side. The electrical conductivity of the housing 7 in this embodiment depends greatly on the carbon fiber to be formulated into the resin material, and the inventor of the present invention has found that a high electrical conductivity can be ensured in a case where the above-mentioned carbon fiber is used. In other words, even if the carbon fiber is damaged to bend at the time of injection molding, for example, there is no such case that the electrical conductivity is lowered.

Note that, according to the verification conducted by the inventor of the present invention, when the formulation amount of the reinforcing fiber in the above-mentioned resin material exceeds 40 mass %, the lower end surface 2b2 of the flange portion 2b may be damaged and worn out due to an increase in frequency of contact between the reinforcing fiber and the lower end surface 2b2 of the flange portion 2b. Further, when the formulation amount falls below 5 mass %, it is impossible to obtain a sufficient reinforcing effect owing to the formulation of the reinforcing fiber, which may result in shortage of the required wear resistance of the housing bottom portion 7b. Therefore, it is desired that the formulation amount of the reinforcing fiber fall within a range of from 5 to 40 mass %.

Further, it is desired that the total amount of filler in the above-mentioned resin material (in a case where filler other than the reinforcing fiber is formulated, the total amount of filler including the filler) be set to 45 mass % or less . The reason therefor is as follows. That is, when the total amount of filler exceeds 45 mass %, the flowability of the resin material is lowered, and as a result, the required accuracy (flatness) of the housing 7 (in particular, bottom portion 7b) cannot be satisfied in some cases.

Hereinabove, the fluid dynamic bearing device 1 according to the embodiment of the present invention has been described, but the above-mentioned structure of the present invention is applicable as long as the fluid dynamic bearing device is structured so that at least one of the members (portions) that form the thrust bearing gaps is an injection-molded article of a resin. Note that, regarding fluid dynamic bearing devices 1 according to other embodiments described below, only different components thereof are described for simplicity of the description, and components corresponding to the components described hereinabove are denoted by the common reference numerals to omit redundant description thereof.

Figure 6:
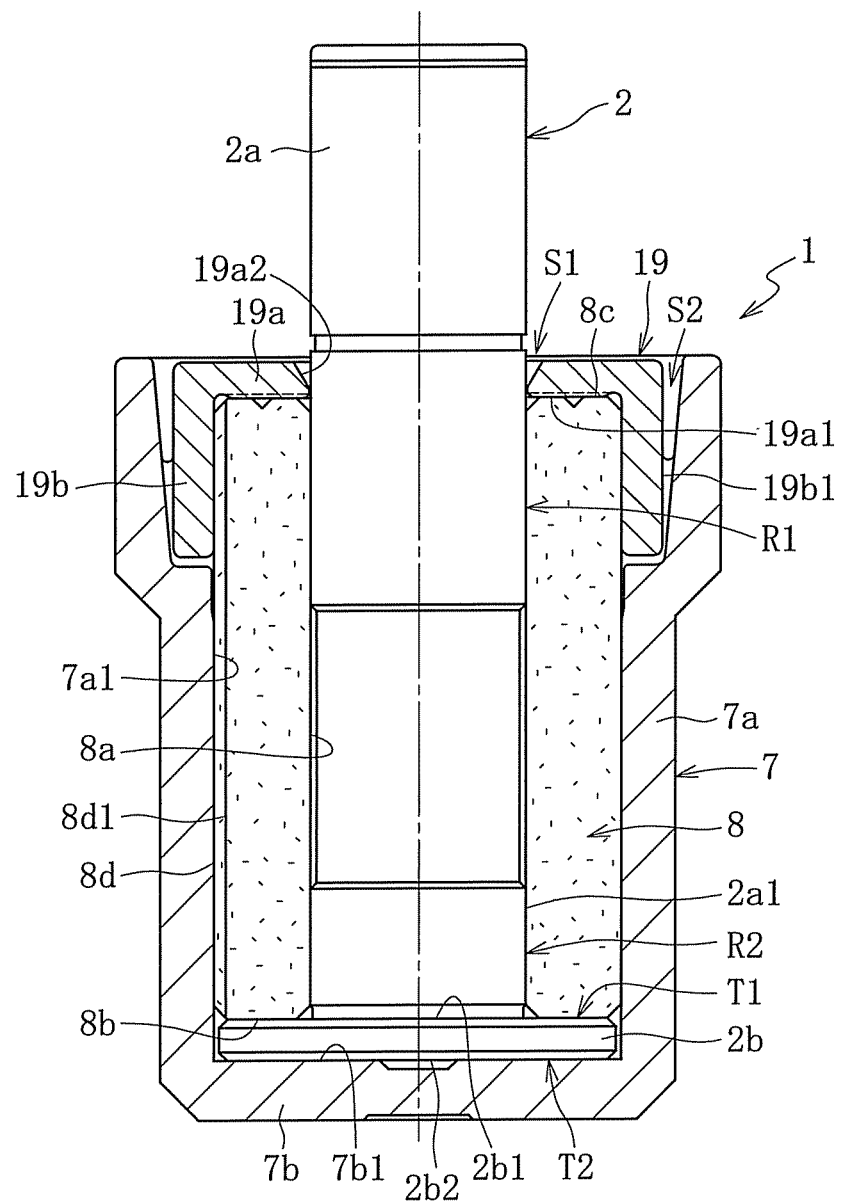
[FIG. 6] A sectional view illustrating a fluid dynamic bearing device according to a second embodiment of the present invention.

FIG. 6 illustrates a fluid dynamic bearing device 1 according to a second embodiment of the present invention. The fluid dynamic bearing device 1 illustrated in FIG. 6 is different from the fluid dynamic bearing device 1 illustrated in FIG. 2 mainly in that a sealing member 19 having an inverse L-shape in cross section is fixed to the upper end portion of the bearing sleeve 8, the sealing member 19 integrally including a plate-like first sealing portion 19a and a cylindrical second sealing portion 19b projecting downward from a radially outer end portion of the first sealing portion 19a. The main difference also resides in that a first seal space S1 is formed between an inner peripheral surface 19a2 of the first sealing portion 19a and the outer peripheral surface 2a1 of the shaft portion 2a, and a second seal space S2 is formed between an outer peripheral surface 19b1 of the second sealing portion 19b and the inner peripheral surface of the housing 7. In the fluid dynamic bearing device 1 of this embodiment, the second seal space S2 is provided on a radially peripheral side of the sealing member 19, and accordingly an axial dimension of the seal space (first seal space S1) formed on the outer periphery of the shaft portion 2a can be reduced as compared to the structure illustrated in FIG. 2. Thus, for example, without increasing the axial dimension of the housing 7, the axial length of the bearing sleeve 8, in other words, the bearing span between both the radial bearing portions R1 and R2, can be increased as compared to the structure illustrated in FIG. 2, with the result that the moment rigidity can be increased. In this embodiment, similarly to the first embodiment illustrated in FIG. 2, the housing 7 is injection-molded using the same resin material as described above.

Figure 7:
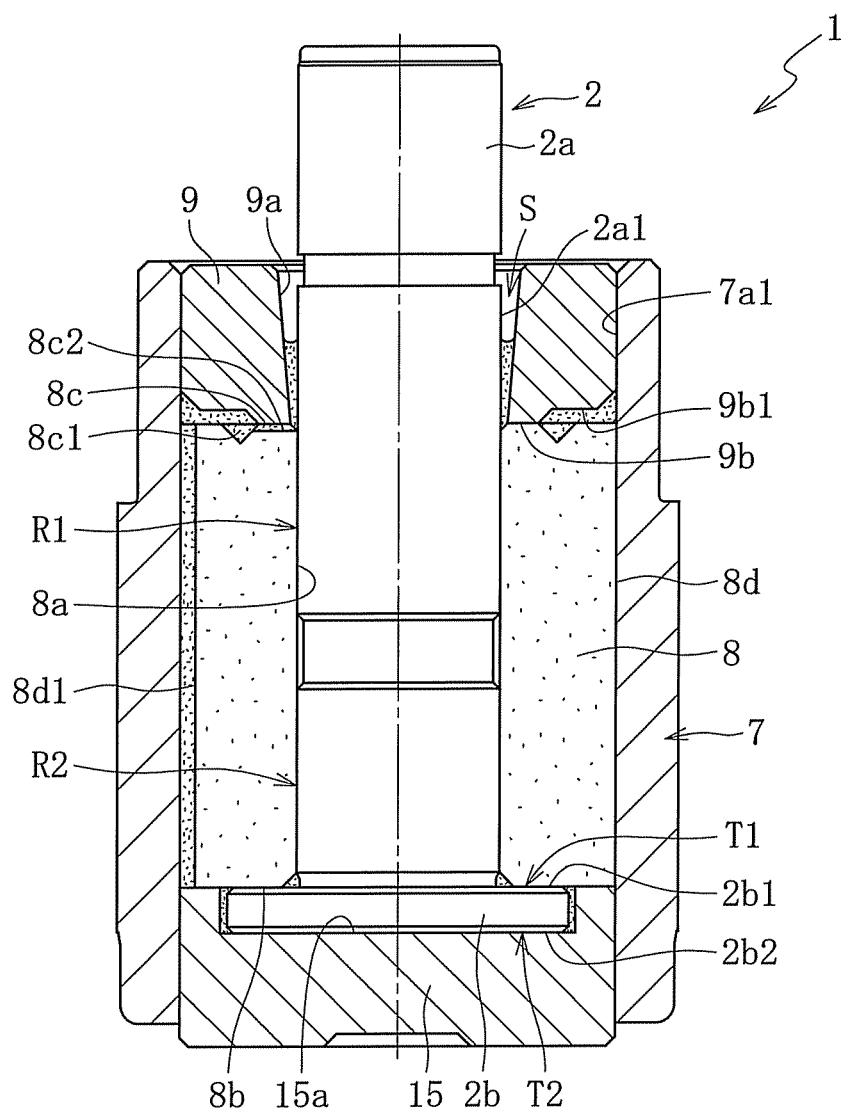
[FIG. 7] A sectional view illustrating a fluid dynamic bearing device according to a third embodiment of the present invention.

FIG. 7 illustrates a fluid dynamic bearing device 1 according to a third embodiment of the present invention. The fluid dynamic bearing device 1 illustrated in FIG. 7 is different from the above-mentioned fluid dynamic bearing devices 1 mainly in that the housing 7 has a cylindrical shape opened in both ends thereof, and the lower end opening portion of the housing 7 is closed by a lid member 15 that is a separate member from the housing 7. The main difference also resides in that the second thrust bearing portion T2 is formed between an upper end surface 15a of the lid member 15 and the lower end surface 2b2 of the flange portion 2b. In this embodiment, the lid member 15 is injection-molded using the same resin material as described above.

Figure 8:
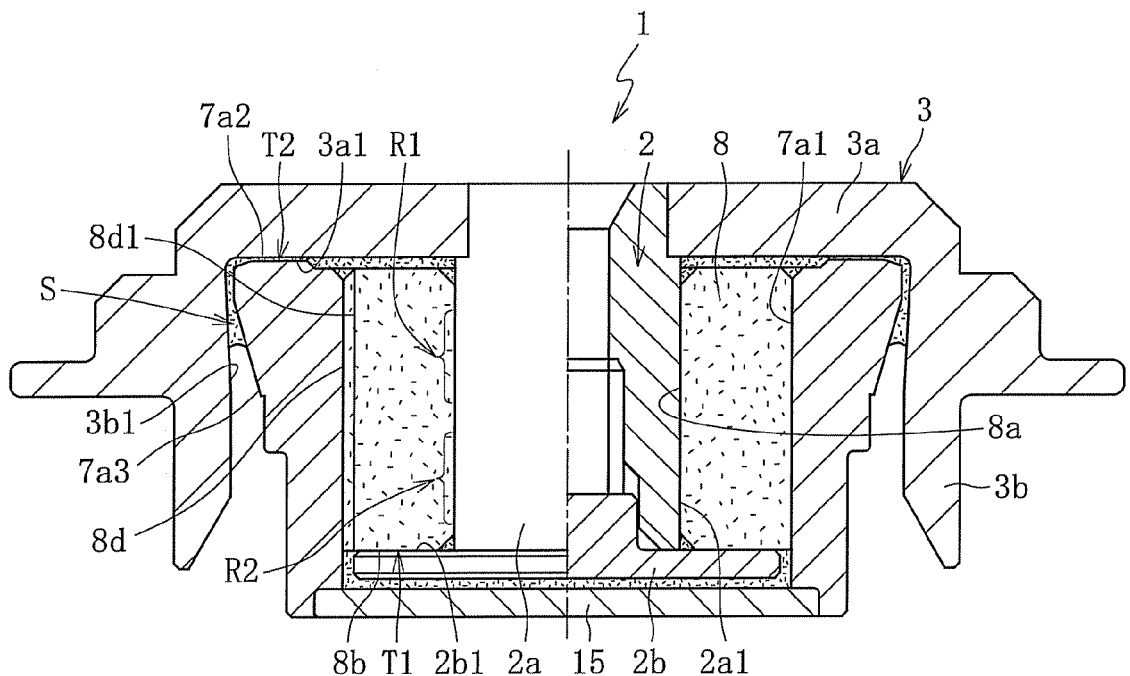
[FIG. 8] A sectional view illustrating a fluid dynamic bearing device according to a fourth embodiment of the present invention.

FIG. 8 illustrates a fluid dynamic bearing device 1 according to a fourth embodiment of the present invention. The fluid dynamic bearing device 1 illustrated in FIG. 8 is different from the above-mentioned fluid dynamic bearing devices 1 mainly in that the second thrust bearing portion T2 is provided between an upper end surface 7a2 of the housing 7 and a lower end surface 3a1 of the disk hub 3, which is provided at the upper end portion of the shaft member 2. The main difference also resides in that the seal space S1 is provided between an upper outer peripheral surface 7a3 of the housing 7 and an inner peripheral surface 3b1 of the disk hub 3. In this embodiment, the disk hub 3 is injection-molded using the same resin material as described above, while the housing 7 is formed of a metal material such as brass.

In the above-mentioned fluid dynamic bearing devices 1, the thrust bearing gap of the second thrust bearing portion T2 (hereinafter, referred to as "second thrust bearing gap") is formed between the member made of a resin and the member made of a metal. In this structure, however, the difference in linear expansion coefficient between the resin and the metal is large, and hence the gap width of the second thrust bearing gap greatly fluctuates along with the change in temperature or the like, which may result in an unstable supportability in the second thrust bearing portion T2.

Figure 9:
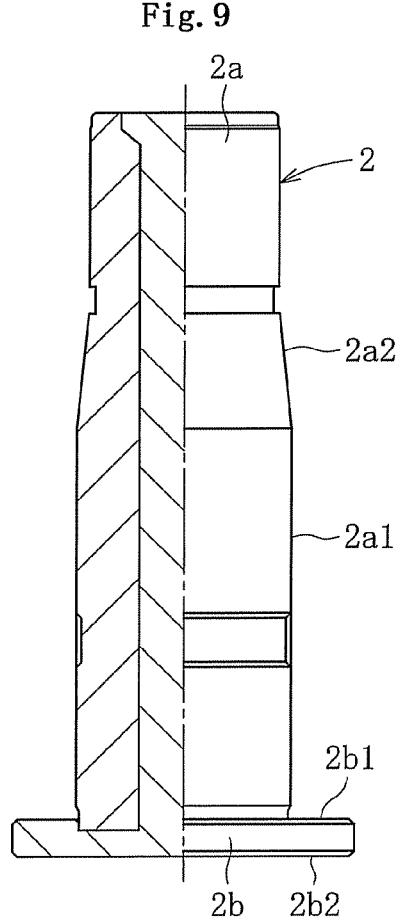
[FIG. 9] A sectional view illustrating another example of a shaft member.

In order to prevent such a trouble to the extent possible, in the fluid dynamic bearing devices 1 illustrated in FIGS. 2, 6, and 7, as illustrated in, for example, FIG. 9, it is effective that the shaft member 2 has a hybrid structure using a metal and a resin, in which the radially outer portion of the shaft portion 2a is formed of a cylindrical metal member 21, while the radially inner portion of the shaft portion 2a and the flange portion 2b are formed of a resin member 22. This is because, with this structure, the linear expansion coefficients of the two members that form the second thrust bearing gap are substantially made common. Note that, in this case, when the resin portion 22 of the shaft member 2 and the housing 7 are formed of a base resin of the same type, a trouble such as adhesion may occur. Therefore, in a case where the housing 7 is formed using a resin material containing an LCP as a base resin, it is desired that the resin portion 22 be formed using a resin material containing, for example, PPS as a base resin.

Further, in the fluid dynamic bearing device illustrated in FIG. 8, by forming both the housing 7 and the disk hub 3 of the resin material, the bearing performance in the second thrust bearing portion T2 can be prevented from becoming unstable as described above to the extent possible.

The above description exemplifies the structure in which the dynamic pressure action of the lubricating oil is generated by the dynamic pressure generating grooves in a herringbone pattern and a spiral pattern as the radial bearing portions R1 and R2 and the thrust bearing portions T1 and T2. Alternatively, as the radial bearing portions R1 and R2, a so-called stepped bearing, multi-arc bearing, or non-cylindrical bearing may be employed, and further, as the thrust bearing portions T1 and T2, a so-called stepped bearing or corrugated bearing may be employed. Further, the radial bearing portions may be provided not only at two positions in the axial direction while being spaced apart from each other, but also at one position in the axial direction or at three positions or more in the axial direction while being spaced apart from one another (each illustration is omitted herein).

Further, the above description is directed to the fluid dynamic bearing device 1 having the shaft member 2 situated on the rotational side and the housing 7 and the like situated on the static side. Needless to say, the structure of the present invention is also applicable to a fluid dynamic bearing device 1 conversely having the shaft member 2 situated on the static side and the housing 7 and the like situated on the rotational side.

EXAMPLES

In order to demonstrate the usefulness of the present invention, comparison and verification were conducted for the case where the structure of the present invention was employed and the case where the conventional structure was employed. FIG. 10 shows results of the verification. The pieces of data shown in FIG. 10 respectively indicate the cases where the housing 7 having a bottomed-cylindrical shape illustrated in FIG. 2 was injection-molded by injecting and filling, into the same molding die, a resin material containing an LCP as a base resin, which is formulated with a predetermined amount of PAN-based carbon fiber having different fiber diameters and aspect ratios, and mean fiber lengths. Note that, the rate of injection of the resin material at the time of molding each housing 7 was set constant, and in this case, set to 100 mm/s.

As apparent from FIG. 10, in Comparative Examples 1 to 4 in which the conventional structure was employed, a predetermined flatness, that is, 7 μm or less in this case, was not satisfied for the upper end surface 7b1 of the bottom portion 7b of the housing 7, whereas, in all Examples 1 to 3 in which the structure of the present invention was employed, the predetermined flatness was satisfied. Further, it is found that, by employing the structure of the present invention, the resistance value can be lessened, that is, the electrical conductivity can be increased. In particular, in the structure of Example 3, in which a reinforcing fiber (carbon fiber) having a mean fiber length of 200 μm was used (corresponding to the structure of claim 2), there can be obtained such an effect that the resistance value is further lessened. As described above, the usefulness of the present invention has been demonstrated.

REFERENCE SIGNS LIST 1 fluid dynamic bearing device
2 shaft member
3 disk hub
7 housing
7a a side portion
7b bottom portion
7b1 upper end surface
8 bearing sleeve
15 lid member
B, C thrust dynamic pressure generating portion
R1 first radial bearing portion
R2 second radial bearing portion
T1 first thrust bearing portion
T2 second thrust bearing portion

The invention claimed is:
1. A fluid dynamic bearing device, comprising:
a stator;
a rotor;
a radial bearing portion for holding the stator and the rotor in a radial direction in a non-contact manner by a dynamic pressure action of a fluid that is generated in a radial bearing gap between the stator and the rotor; and
a thrust bearing portion for holding the stator and the rotor in a thrust direction in a non-contact manner by a dynamic pressure action of the fluid that is generated in a thrust bearing gap between the stator and the rotor, wherein a part of at least one of the stator and the rotor that faces the thrust bearing gap is formed by injection-molding by using a resin material, and wherein the resin material comprises a liquid crystal polymer as a base resin formulated with, as filler, a PAN-based carbon fiber having a fiber diameter of 6 to 8 μm and an aspect ratio of 10 to 40.

2. A fluid dynamic bearing device according to claim 1, wherein the PAN-based carbon fiber has a mean fiber length of 100 to 200 μm.

3. A fluid dynamic bearing device according to claim 1, wherein a formulation amount of the PAN-based carbon fiber in the resin material ranges from 5 to 40 mass %.

4. A fluid dynamic bearing device according to claim 1, wherein a total amount of the filler in the resin material is 45 mass % or less.

5. A fluid dynamic bearing device according to claim 1, wherein part of a first one of the stator and the rotor that faces the thrust bearing gap is formed by injection-molding of the resin material, and wherein part of a second one of the stator and the rotor that faces the thrust bearing gap is formed by injection-molding of a resin material containing a different base resin from the base resin of the part of the first one of the stator and the rotor.

* * * * *